US009264485B1

(12) United States Patent
Ranganathan et al.

(10) Patent No.: US 9,264,485 B1
(45) Date of Patent: Feb. 16, 2016

(54) SYSTEM AND METHOD FOR SYNCHRONIZING AND PRIORITIZING MULTIPLE DISPARATE RETAIL SYSTEMS

(75) Inventors: Sundar Ranganathan, Dedham, MA (US); Murtaza Ghadyali, Dedham, MA (US); Stan Hawkins, Dedham, MA (US); Arun Santhanam, Dedham, MA (US)

(73) Assignee: Reflexis Systems, Inc., Dedham, MA (US)

( * ) Notice: Subject to any disclaimer, the term of this patent is extended or adjusted under 35 U.S.C. 154(b) by 0 days.

(21) Appl. No.: 13/530,024

(22) Filed: Jun. 21, 2012

(51) Int. Cl.
*H04L 29/08* (2006.01)
*G06F 15/163* (2006.01)

(52) U.S. Cl.
CPC .............. *H04L 67/10* (2013.01); *G06F 15/163* (2013.01)

(58) Field of Classification Search
CPC  G06F 15/16; G06Q 10/107; H04L 29/08072; H04L 12/5895
USPC ......................................................... 709/207
See application file for complete search history.

(56) References Cited

U.S. PATENT DOCUMENTS

| 8,799,371 B2 * | 8/2014 | Davis et al. ................... 709/206 |
| 2008/0256191 A1 * | 10/2008 | Murphy et al. ............... 709/206 |
| 2008/0270560 A1 * | 10/2008 | Tysowski et al. ............. 709/207 |

* cited by examiner

*Primary Examiner* — Vivek Srivastava
*Assistant Examiner* — Sibte Bukhari
(74) *Attorney, Agent, or Firm* — Smith Risley Tempel Santos LLC; Steven P. Wigmore

(57) ABSTRACT

A method and system for synchronizing and prioritizing messages from separate systems includes receiving a message from a computer network having a unique identifier. Next, this message having the unique identifier may be compared to at least one of a rule and a formula stored in a database. If the message with the unique identifier matches at least one of a rule and a formula stored in the database based on the unique identifier, then the message may be supplemented with an action identifier. Subsequently, the message may be prioritized relative to one or more other messages based on at least one of a source identifier and the action identifier. The message may then be transmitted to a notifier. The notifier may relay the message over the communications network to at least one of an application content provider (ACP) and/or a target application upon receiving a request for transmitting messages.

20 Claims, 6 Drawing Sheets

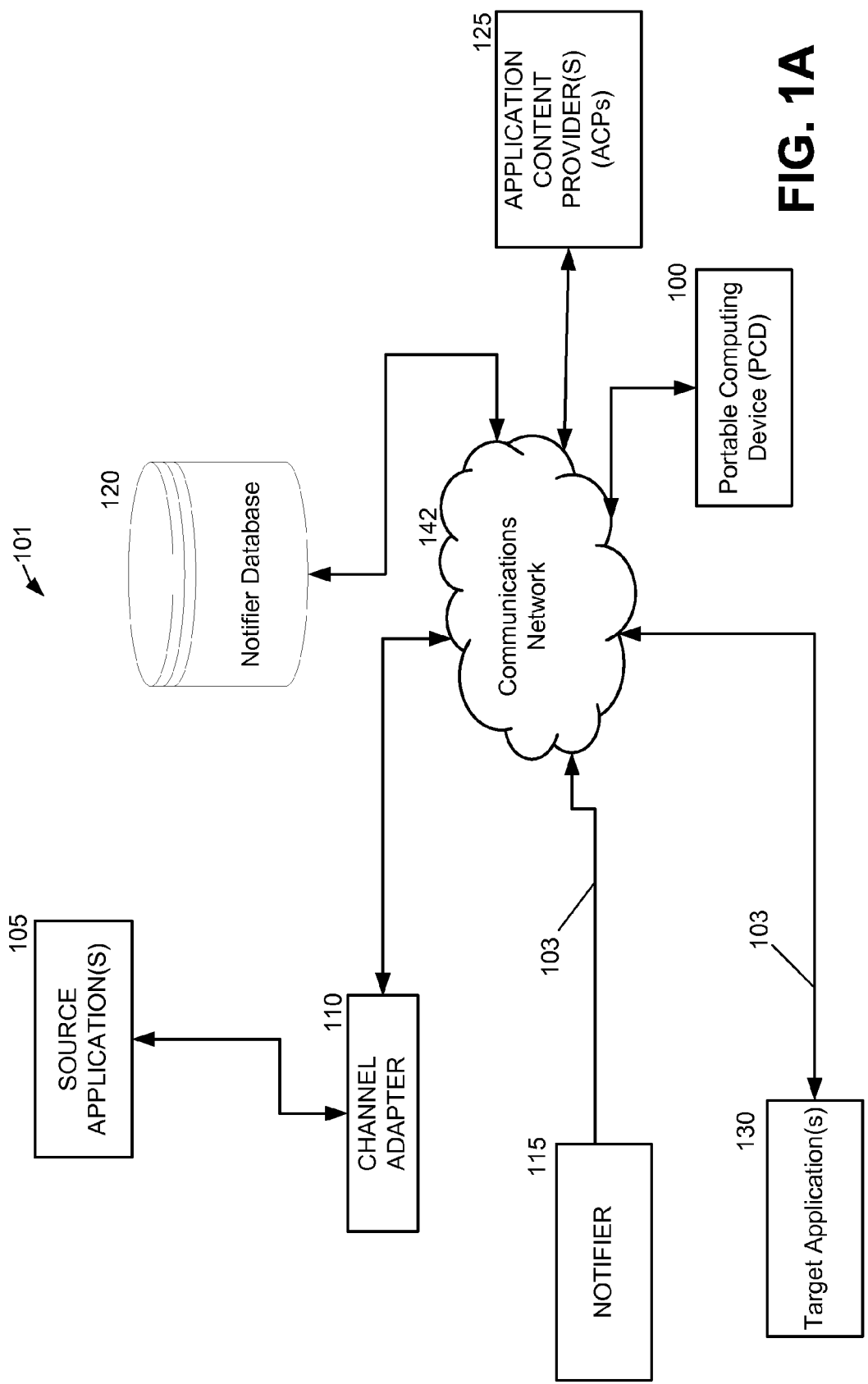

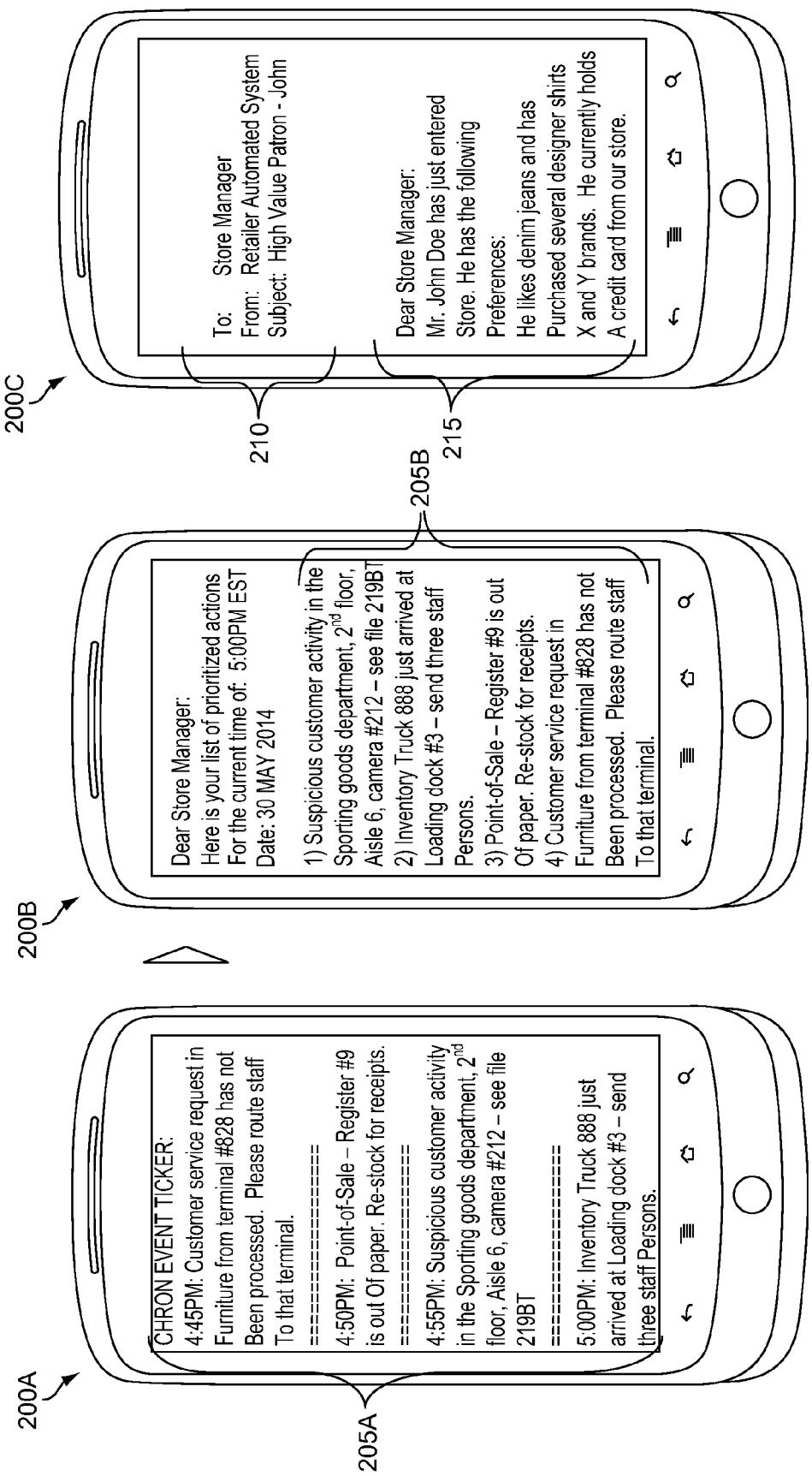

SYSTEM AND METHOD FOR SYNCHRONIZING AND PRIORITIZING MULTIPLE DISPARATE RETAIL SYSTEMS

PRIORITY CLAIM AND RELATED APPLICATIONS STATEMENT

Priority under 35 U.S.C. §119(e) is claimed to U.S. provisional application entitled "METHOD AND SYSTEM FOR PROVIDING ADAPTIVE LABOR ALLOCATION," filed on Jun. 22, 2012 and assigned U.S. provisional application Ser. No. 61/499,969. The entire contents of this provisional patent application is hereby incorporated by reference.

BACKGROUND

Conventionally, merchants who sell goods and/or services typically rely upon multiple separate and discrete systems for managing events that occur usually in a retail context. For example, a merchant may rely upon a first system sold by a first manufacture that manages checkout and point-of-sale ("POS") purchases. The same merchant may also rely upon a second system sold by a second manufacture which monitors store activity and the number and type of patrons who may enter a facility operated by the merchant for selling the goods and/or services. The merchant may also have a third system sold by a third manufacture which monitors security and suspicious activity for the facility.

In such an exemplary scenario, the merchant must check-in with each of the three systems to monitor the ongoing activities of his or her retail facility. In many circumstances, the merchant must hire separate employees to monitor and manage each of the three separate systems. Even with three separate employees to manage each of the three separate systems, a merchant does not have all the tools he or she needs to prioritize and monitor the data generated by the three separate systems.

Accordingly, what is needed in the art is a method and system for synchronizing and prioritizing multiple disparate systems that may help merchants in a retail environment, such as those described above.

SUMMARY

A method and system for synchronizing and prioritizing messages from separate systems includes receiving a message from a computer network having a unique identifier. Next, this message having the unique identifier may be compared to at least one of a rule and a formula stored in a database. If the message with the unique identifier matches at least one of a rule and a formula stored in the database based on the unique identifier, then the message may be supplemented with an action identifier. Subsequently, the message may be prioritized relative to one or more other messages based on at least one of a source identifier and the action identifier.

The message may then be transmitted to a notifier. The notifier may relay the message over the communications network to at least one of an application content provider (ACP) and/or a target application upon receiving a request for messages from an ACP and/or target application. Each unique identifier may comprise alphanumeric characters.

Prioritizing the message may include prioritizing the message using weighting wherein the weighting comprises an integer value reflecting a relative importance based on one of a source of the message and an action associated with the message. Weighting may also be assigned to a message based on at least one of the source identifier and action identifier. Each action associated with a message may be assigned a predetermined lifespan. Near the end of processing, data that comprises a prioritized list of events based on a plurality of messages that were matched against at least one rule or formula in a database may be provided.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "100A" or "100B", the letter character designations may differentiate two like parts or elements present in the same figure. Letter character designations for reference numerals may be omitted when it is intended that a reference numeral to encompass all parts having the same reference numeral in all figures FIG. 1A illustrates an exemplary embodiment of a system for synchronizing and prioritizing multiple disparate systems;

FIG. 2A is an exemplary user interface that may be executed on a portable computing device which may provide a chronological based event ticker based on data from a task management system of FIG. 1B according to one exemplary embodiment;

FIG. 2B is an exemplary user interface that may be executed on a portable computing device which may provide a prioritized list of data from a task management system of FIG. 1B according to one exemplary embodiment;

FIG. 2C is another exemplary user interface that may be executed on a portable computing device which communicates with an e-mail system of FIG. 1B according to one exemplary embodiment;

DETAILED DESCRIPTION

Figure 1B:
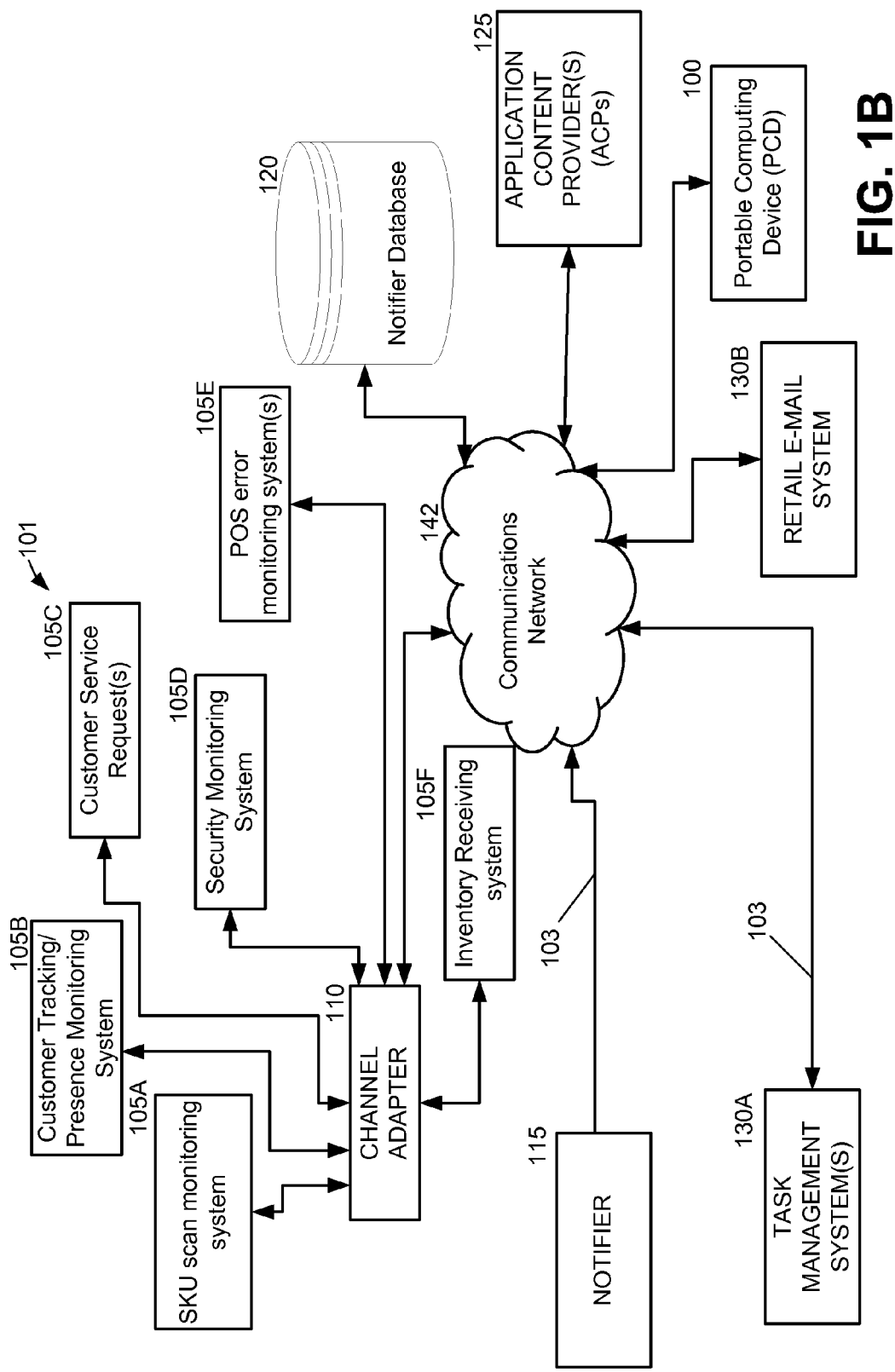
FIG. 1B is a functional block diagram showing further detail and a further exemplary embodiment of the system for synchronizing and prioritizing multiple disparate systems as illustrated in FIG. 1A.

The word "exemplary" is used herein to mean "serving as an example, instance, or illustration." Any aspect described herein as "exemplary" is not necessarily to be construed as exclusive, preferred or advantageous over other aspects.

Referring now to the figures, FIG. 1A illustrates an exemplary embodiment of a system 101 for synchronizing and prioritizing multiple disparate systems. The system 101 may comprise one or more source applications 105, a channel adapter 110, a notifier 115, a notifier database 120, one or more application content providers 125, and one or more portable computing devices 100.

Each of these elements may be coupled to one another through a computer communications network 142. The computer communications network 142 may comprise a wide area network ("WAN"), the plain-old-telephone-system ("POTS), a local area network ("LAN"), the Internet, or any combination of these and other networks. Through the network 142, the channel adapter 110 may communicate with a notifier database 120 and one or more notifiers 115.

The target applications 130 and application content providers 125 may communicate with the portable computing device 100 over the network 142 as well. The portable computing devices ("PCDs") 100 may take on many different forms such as desktop computers, laptop computers, tablet personal computers ("PCs"), handheld devices such as personal digital assistance ("PDAs"), in addition to other smart devices such as smartphones and cellular telephones. Any device which may access the network 142, whether directly or via a tether to a complimentary device may be characterized as a PCD 100.

The PCDs 100 as well as the channel adapter 110 along with the notifiers 115, target applications 130, and application content providers 125 may be coupled to the network 142 by various types of communication links 103. These communication links 103 may comprise wired as well as wireless links. Wireless links include, but are not limited to, radio frequency (RF), near field communications (NFC), optical such as infrared, magnetic, and/or acoustic types of communication links. The communication links 103 allow each of the devices/systems to establish direct, virtual links among one another.

A source application 105 may comprise any type of hardware and/or software which monitors activities, events, transactions, and/or services for a retail establishment. For example, the source application 105 may comprise a traffic counter which counts the number of customers entering the retail establishment. The source application 105 may comprise a camera, an inventory system, an RFID system, and other similar systems. The source application 105 may also comprise one or more combinations of systems that track activity within a retail establishment.

The source application 105 may be coupled to a channel adapter 110. While the source application 105 is illustrated in FIG. 1A is being directly coupled to the channel adapter 110, it is understood to one of ordinary skill in the art that this coupling may comprise a "virtual" connection or "virtual" coupling in which the source application 105 is coupled to the channel adapter 110 through a communication link 103 established by the communications network 142. However, for simplicity, this link between the source application 105 and the channel adapter 110 has been illustrated with a direct link between these two system elements.

The source application 105 may transmit messages to the channel adapter 110. The channel adapter 110 may comprise business logic which will be described in detail below. The source application 105 may determine that an event has occurred which needs attention of a merchant and it may generate a message that is transmitted to the channel adapter 110 which may describe this event.

The source application 105 may comprise its own system or server that is separate relative to the channel adapter 110. The channel adapter 110 may comprise its own server relative to the source application 105 and the notifier 115. Alternatively, the channel adapter 110 and the notifier 115 may be executed with a single server relative to the source application 105.

The channel adapter 110 is coupled to a notifier database 120 as well a notifier 115 via the communications network 142. The channel adapter 110 may search the notifier database 120 so that the channel adapter 110 may match a message from the source application 105 with the notifier 115.

The notifier database 120 may further comprise formulas and/or rules that inform the channel adapter 110 how to manage messages that it may receive from one or more different types of source applications 105. The notifier database 120 may comprise a sequential query language (SQL) database or any other type of database software and/or hardware as understood by one of ordinary skill in the art.

Each message generated by the source application 105 may comprise an open text message that is uniquely formatted for each source application 105. The channel adapter 110 is provided with data about message formatting so that the channel adapter 110 may extract relevant portions of the open text message that may be destined for a specific notifier 115. This data on the formatting of a message from a source application 105 may be stored in the notifier database 120 and retrieved by the channel adapter 110 when the channel adapter 110 matches a message with data in the notifier database 120.

If a message generated by a source application 105 qualifies to be passed on to a particular notifier 115 as determined by the formulas and/or rules stored in the notifier database 120 which are reviewed by the channel adapter 110, then the channel adapter 110 may transmit or relay the message to a specific notifier 115 that was identified from the notifier database 120. A specific notifier 115 for each particular message may be identified by the channel adapter 110 based on the content and type of message received.

For example, the source application 105 may comprise a method or system for detecting a high valued patron of a retail establishment. In one exemplary embodiment, the source application 105 may comprise hardware and/or software for detecting customer identifiers associated with portable computing devices 100, like mobile phones. Based on a particular customer identifier, the source application 105 may determine that a person or operator of the portable computing device 100 is a high valued patron relative to the retail establishment.

The source application 105 may construct a message to alert appropriate personnel of the retail establishment that a high valued patron has entered the space of the retail establishment. According to one exemplary embodiment, this message may start with the alpha numeric characters "HVP1" which may translate to high valued patron one.

The source application 105 may also include within that message the exact location at which the high valued patron was detected such as at the entrance of the space of the retail establishment. The message may also comprise a digital image of the high valued patron captured by a camera operated by the source application 105.

The source application 105 may further comprise or be coupled to another source application 105 that includes an affinity database that comprises additional information stored about various high valued patrons. For example, based on the mobile phone number acquired by the source application 105, the source application 105 may search an affinity database (not illustrated but part of source application 105) in order to gather additional information about the high valued patron such as preferences of the high valued patron. The source application 105 may include some or all of this information gathered about the high valued patron and place this information in the message which is sent to the channel adapter 110.

The source application 105 may create a unique message identifier for this particular message corresponding to the high-value patron entrance event described above. For example, the source application 105 in this exemplary embodiment may create the unique message identifier of "HVP1001." This message is then transmitted to the channel adapter 110.

The channel adapter 110 accesses the rules and/or formulas associated with the retail establishment for the source application 105 that are stored in the notifier database 120. The channel adapter 110 may then process the message according to the rules and/or formulas. Each rule may link an action if a condition identified from a message exists.

According to the exemplary embodiment described above, one rule may state that for each high-value patron which enters the retail establishment, send an e-mail alert to the manager of the retail establishment so that the manager may greet the high valued patron personally. This means that when the channel adapter 110 receives the message with the unique identifier "HVP1001," this message may contain preferences associated with the high-value patron in addition to the name of the patron.

This information may be relayed to an appropriate notifier 115 that generates an e-mail message that is transmitted to the store manager who also has a portable computing device 100 so that the store manager may greet the high-value patron in person by name and with knowledge of the preferences for the high-value patron. Such a scenario may increase the chances that the manager may secure a sale with the high-value patron. The rule in the notifier database 120 may state that if a message comprises the character combination of "HVP", then specific one or more actions may need to be taken by the system 101 such as generating an e-mail message to the manager of the retail establishment described above.

If the channel adapter 110 does not identify or locate any rules and/or formulas associated with a message generated by the source application 105, the channel adapter 110 may just log the message occurred without taking any further action in association with the message. However, as described above, if the channel adapter 110 does match a message produced by the source application 105 with a rule and/or formula, then the channel adapter 110 may assist with completing the action associated with the rule and/or formula taken from the notifier database 120.

The channel adapter 110 may also supplement the message that is passed on to a particular notifier 115. Specifically, the channel adapter 110 may supplement the message with additional actions that may be required of the notifier 115 and/or other systems that are coupled to the notifier 115. These message supplements may comprise alphanumeric text characters that may uniquely identify actions to be taken by the notifier 115 and/or other systems coupled to the notifier 115.

The notifier 115 may receive the message from the channel adapter 110. The system 101 may take on the form of an asynchronous model which is a store and forward model and that transmits messages to appropriate and relevant subsystems downstream. Based on the actions contained in the message which were generated by the channel adapter 110, the notifier 115 writes a database entry into the notifier database 120 that may comprise a timestamp, a flag (such as, but not limited to, a bit that states the message entry is ready to process), a source identifier, and an action identifier. The source identifier is generated by the source application 105.

The action identifier comprises one or more actions that another subsystem may take in response to the message which was originally generated by the channel adapter 110. So for the exemplary embodiment described above, if an e-mail to the manager of the retail establishment is needed, then the notifier 115 writes the actions required of the subsystem that manages e-mails for the retail establishment in the notifier database 120. At this stage, the e-mail to the manager of the retail establishment has not been created/generated.

The notifier 115 may be coupled to one or more application content providers (ACPs) 125. The application content providers 125 are responsible for relaying the database entries created by the notifier 115 to one or more target applications 130 which may actually execute the action identifiers listed in the database. The application content providers 125 routinely and constantly pinging/sending requests to the notifier 115 in order to pull database entries that have been created by the notifier 115 in the database.

The application content providers 125 may also comprise application programming interfaces (APIs) that allow them to communicate directly in the language of the target applications 130 which will be executing the action identifiers written into the entries of the notifier database 120. The application content providers 125 may also initiate or start one or more of the actions contained in a particular entry in the notifier database 120.

Relative to the notifier 115 and channel adapter 110, the application content provider 125 may reside on a separate server relative to these two processing entities. In other exemplary embodiments, the application content provider 125 may reside on the same server as the channel adapter 110 and notifier 115. Typically, the target application 130 usually resides on its own server relative to the application content provider 125.

However, the number of servers and how each processing entity is assigned to a particular server is usually directly associated with the size and information needed to manage a particular retail establishment. Therefore, a retail establishment that is relatively small in physical size and with respect to product inventory, will usually have a more compact system 101 in which two or more processing entities may reside on the same server.

Meanwhile, in larger retail establishments that occupy entire buildings with multiple floors of inventory that generate significant volumes of information, such retail establishments with the size would usually command each processing entity to reside on separate servers 110, 115 and in some cases each processing entity may require multiple servers due to the volume of information managed that is associated with the larger product and/or service inventory.

In the e-mail example sent to the portable computing device 100 of the manager of the retail establishment described above, an application content provider 125 would have the requisite one or more program modules for creating an e-mail that is destined for the portable computing device 100 of the manager of the retail establishment. The application content provider 125 may pass the e-mail to a target application 130 that can send the e-mail over the computer communications network 142 to the portable computing device 100 of the manager.

As another example, for an application content provider 125 that works with a task management system that is part of a target application 130, the application content provider 125 may constantly send requests to notifier 115 requesting that the notifier 115 search the notifier database 120 for particular tasks associated with the task management system. The application content provider 125 may request the notifier 115 to search for all tasks in the notifier database 120 having a unique task identifier associated with an update status.

The notifier 115 would then relay any tasks associated with that task ID back to the application content provider 125. The application content provider 125 may perform an update to the task and then relay it to the target application 130 that may comprise the task management system. The task management system (target application 130) may store the update to the task and alert an operator of the task management system of the update to the task.

The relationship between the application content provider 125 and the notifier 115 may be characterized as a request/response model since the application content provider 125 is constantly sending requests to the notifier 115. The notifier 115 response to an application content provider 125 by relaying a database entry from the database 120 that is intended for the particular application content provider 125. The application content provider 125 may be polling the notifier 115 with requests every second, every few minutes, every few hours, or several days during the week etc. depending upon the work associated and programmed for the application content provider 125.

The requests from the application content providers 125 may be specific to particular source applications 105. The request may be specific in that a request may be tailored to a particular source identifier so that the application content provider 125 may request the notifier 115 to search for all recent database entries within the database 120 and associated with a specific and unique source identifier as well as any action identifiers, such as action identifiers associated with generating an e-mail.

The notifier 115 would then conduct a query of the database 120 for all recent entries associated with the specific and unique source identifier. If any recent entries are found, the notifier 115 would then relay these database entries to the application content provider 125. The notifier 115 would then mark each entry in the database 120 that was forwarded to the application content provider 125 as being old or already processed so that the notifier 115 would not relay the same entry to an application content provider 125 in a subsequent query of the database 120.

One unique aspect of the system 101 is the simplicity of the model with respect to how information is segmented or compartmentalized among the various processing entities. The system 101 also provides an advantage with respect to scalability in that it is a model which is easily scalable to larger retail establishments as well as smaller retail establishments. The system 101 may link various disparate source applications 105 with various disparate target applications 130 which may be sold separately and produced/manufactured by different companies. The system 101 may be characterized as a universal translator model.

The channel adapter 110 may function as a gatekeeper with respect to information being produced by the source application 105. The notifier 115 constantly updates the notifier database 120 with data that is qualified by the channel adapter 110 which functions as the gatekeeper. The system 101 may manage significantly large volumes of information from disparate source applications 105. The system 101 organizes information and work that is required of target applications 130 without the target applications 130 becoming bogged down or overloaded with the volume of information produced by the source applications 105.

In this way, the one or more source applications 105 are free to produce data as quickly as they are capable of generating such data while target applications 130 responsible for executing tasks or work associated with the data collected from the source applications 130 at their own pace irrespective of the speed at which the source applications 105 generate their data.

The system 101 also allows a merchant, such as a retailer, to prioritize which information and what actions should be taken first in response to the data generated by the source applications. The system 101 allows a merchant to prioritize actions of its target applications 130 in response to the data that is collected from the source applications 105.

Referring now to FIG. 1B, this figure is a functional block diagram showing further detail of another exemplary embodiment of system 101 for synchronizing and prioritizing multiple disparate systems as illustrated in FIG. 1A. The system 101 may assist a store manager of a retail establishment in managing and prioritizing information.

The system 101 of FIG. 1B is very similar to the system 101 illustrated in FIG. 1A. Therefore, only the differences between these two systems 101 will be described below.

According to the exemplary embodiment illustrated in FIG. 1B, several different source applications 105 have been provided. For example, the system 101 may include a stock-keeping-unit ("SKU") scan monitoring system 105A, a customer tracking/presence monitoring system 105B, a customer service request system 105C, a security monitoring system 105D, a POS error monitoring system 105E, and an inventory receiving system 105F.

Additionally, the system 101 further includes at least two target applications such as a task management system 130A and an e-mail system 130B. As noted previously, the system 101 is not limited to the specific source applications 105 and target applications 130 illustrated in FIG. 1B.

In a hypothetical complex scenario, a truck full of new inventory may be arriving at the loading dock of a retail establishment/facility at the same time as several high-value patrons walking into the entrance of the same retail establishment. In parallel to these two events, the point-of-sale terminals may be experiencing problems or glitches that need to be resolved. And at the same time, a security alert may have been activated due to a potential shoplifting incident. The retail establishment has the system 101 illustrated in FIG. 1B in place to assist with managing these events.

These simultaneous events are representative of ones that managers of retail establishments may experience every day and within short timing windows such as within the order of 10 or 15 minutes or less. The system 101 may assist the store manager in prioritizing which event needs to be addressed first and how each event may be addressed such as allocating personnel to each event.

According to the exemplary embodiment illustrated in FIG. 1B, the truck full of new inventory arriving at the loading dock of the retail establishment may be detected by the inventory receiving system 105F. Meanwhile, high-value patrons walking into the entrance of the same retail establishment may be detected with the customer tracking/presence monitoring system 105B. Problems or glitches that need to be resolved with the POS terminals may be tracked with the POS error monitoring system 105E. The security alert indicating a potential shoplifting incident may be generated by the security monitoring system 105D.

In response to these events, the system 101 may generate an event ticker 205A that is displayable on a display device such as on a small screen of a smart phone 100 such as illustrated by the user interface 200A in FIG. 2A described below. The event ticker 205A may display the events as they occur in real time and in a real-time sequence as well as providing a separate listing 205B illustrated in FIG. 2B which prioritizes events based on rules and/or formulas programmed into the notifier database 120.

The system 101, and specifically, the channel adapter 110 and the notifier 115 may comprise application programming interfaces (APIs) that may be provided to each source application 105 and each target application 130 so that each source application 105 and each target application 130 may communicate with the channel adapter 110 and the notifier 115. These application programming interfaces (APIs) are supplied in appendix A of this disclosure.

As described above in connection with FIG. 1A, with the rules and/or formulas of the notifier database 120, a merchant may weight event types detected by the source applications 105 so that the most important events are given priority over other types of events. One advantage of the system 101 is that multiple, disparate source applications 105 may contribute to a single, centralized system 101 of "serialization and prioritization." Serilization determines which steps occur in which order while Prioritization determines which steps, or sequence of steps, to perform first.

"Customer Service Request" source application 105C believes its events are the highest priority for a merchant, while "Cash Register Errors" detected by the POS error source application 105E believes its events are the highest priority for the merchant. Similarly, "Suspicious Customer Behavior" detected by the security monitoring system 105D believes its events are at the highest priority for the merchant. Meanwhile, "Truck Arrival" detected by the inventory receiving system 105F believes its events are at the highest priority for the merchant.

Each of these source applications 105 may be autonomous and may have no knowledge of or visibility into the functional priorities of other source applications 105. With rules and/or formulas of the notifier database 120, the merchant may direct the priority such that events detected by the security monitoring system 105D are given more weighting or a higher weighting relative to events detected by the POS error source application 105E in the inventory receiving system 105F, etc.

Another advantage of the system 101 is that the metrics used in the notifier database 120 to determine the "Weighted value" of each source application 105 may change dynamically throughout the day. For example, during certain times, such as when the retail establishment is closed to the public, the inventory receiving system 105F may have a higher/greater weight (higher priority) relative to events which may be detected by the POS error source application 105E. These prioritization time windows may be configured to best model the expected activities of the retail establishment on a day to day basis.

Similarly, the relative importance of a message Source and Action can vary across time. For example, the weight assigned to events related to customer service may increase during peak shopping hours while the weight assigned to operational tasks such as receiving/stocking etc., may increase during off peak shopping hours.

Additionally, other metrics such as sales data, staffing data, profitability, workload, etc. may be bound to the method of prioritization and serialization. For example, an action may be indicated based on the source message, however the action may require staff or additional workload. The system 101 may utilize current staffing and workload in prioritizing the action and can be directed to alert the store manager when action is indicated but store resources are not available to perform the action.

The system 101 tracks the execution of the best practice actions that must occur in order to act on and otherwise fulfill the decisions that are reached by various decision management tools.

The following provide some exemplary ways in which formulas and/or rules may be established within the notifier database 120: Weighting by source, weighting by action, weighting by message type, and actions driven by one or more formulas.

Weighting by Source:

Each source event message generated by a source application 105 may result in different actions, depending on the message content and the parsing rules developed in the formulas used to evaluate the message which are stored in the notifier database 120. A specific source application 105 may also have a job in retail that is considered high priority. As such, messages from one source application 105 may have higher importance for causing an immediate action compared to messages from some other source application 105. For example, messages from the security monitoring system 105D may be weighted with higher importance compared to messages from the POS error monitoring system 105E.

To support source application prioritization, each source application 105 may be configured with a "weight." Typically, a weight may comprise an integer value: the larger the sources application's weight, the higher the importance of messages from that source. Other weighted metrics may also be applied to provide greater context value to the retailer. For example, the weighted value may reflect impact to sales, profitability, operations, customer service or other business driven factors with each metric contributing to an accumulated weight for action prioritization.

Weighting by Action:

A given action may be indicated for by different source applications 105 based on the formulas applicable to the originating source message. As such, an action itself that has a common purpose may be requested from different business processes to satisfy disparate, multi-channel outcomes.

Each action may be configured with a "weight." Typically, the weight may comprise an integer value. The larger the actions' weight, the higher the importance of the action. Other weighted metrics may also be applied to provide greater context value to the retailer. For example, the weighted value may reflect impact to sales, profitability, operations, customer service or other business driven factors.

In this way, when multiple actions have been queued for a given application content provider ("ACP") 125, the ACP 125 may easily determine which action is of paramount importance based on its numerical weighting. Additionally, because the same action may ultimately be invoked from different sources, the weight of the source may be used to determine the macro-priority for an action item.

For example, if POS error monitoring system 105E with source weight value of 5 indicates an action with weight value of 5, and the security monitoring system 105D with a weight value of 10 indicates the same action with a weight value of 5, then the action requested by the security monitoring system 105D (10×5=50) will be processed first by the appropriate ACP 125 compared to the action requested by the POS error monitoring system 105E (5×5=25 which is less than 50). Additionally, when the ACP 125 requests "Open Action Items" from the notifier 115, the notifier 115 may deliver the requested action items in a weighted order.

Sequencing and Flow Control within Formula Action Sets:

A source event message generated by a source application 105 may satisfy logical configuration requirements for one or many formulas stored in the notifier database 120. When the channel adapter 110 encounters multiple action event formulas, the channel adapter 110 may require access to a sequencing/prioritization model to determine the order in which formulas and their respective set of actions are processed.

Each formula may allow for configuration of priority. Similar to the weighting described above, each priority may comprise integer values where a message with a value of 1 is processed before an message having a value of 3 and an message with a value of 3 is processed before a message assigned a value of 5, etc.

This priority may become important in some situations to accommodate internal control actions such as a Passthrough. A Passthrough action may be used to stop formula evaluation after processing a current formula.

Exemplary Formula(s) for Action(s):

Qualifying formulas may result in actions that are executed by target applications, like the task management system 130A or e-mail system 130B and/or by an application content provider ("ACP") 125. Multiple actions may be configured for each formula and each action may be processed by a different ACP 125. A single action may be staged (queued) to be processed by the action's respective ACP 125. This may be characterized as a standard asynchronous processing model ("async model"). This async model presents challenges for prioritization since the actions themselves, usually processed by their respective ACPs 125, are also autonomous.

Because multiple actions can be assigned to a single formula, and each action may have a different ACP 125, a method to control the prioritization or sequence of execution for the actions may be linked to the formula.

Exemplary Actions Having a "Lifespan":

Certain actions to be taken by a target application 130 and/or an application content provider 125 may be designed for a limited time span. If an action is queued in the notifier database 120, but the corresponding ACP 125 is off-line or otherwise disabled (throttling, etc.), then, the action itself may become irrelevant.

When an action is linked to a formula, the action may be configurable, allowing a specification for viable lifespan. The duration of the configured action may be designed to have at least one of two options: (a) Never Expire, and (b) Expire according to a time range, such as in Hours, Minutes, and/or Seconds.

For example, if the lifespan for an action is set to 0 Hours, 5 Minutes, and 30 Seconds and the ACP 125 requests new actions from the database 120 after six minutes after the action is initially stored in the database 120, the notifier 115 will fail the request from the ACP 125 and generate a negative acknowledgement ("NACK") message that is relayed to the requesting ACP.

By designing actions with lifespans, this allows the system 101 to have recency controls.

Prerequisite Actions:

Prerequisite actions may allow support for workflow sequences. If a specific action is configured to have a prerequisite action, the action will not be delivered based on an ACP request unless the prerequisite action has been processed:
(1) the prerequisite Action may be delivered normally to the ACP 125; in this case, any "downstream" action, having the normally processed action as a prerequisite, is available for delivery to an ACP 125 if otherwise viable; or
(2) the prerequisite action may have expired—where each action having a prerequisite action may also allow for the configuration of cascade actions: (a) expire when parent action expires or (b) remain available when parent action expires.

By designing actions with perquisites, this allows the system 101 to have workflow control and sequence control.

Figure 1C:
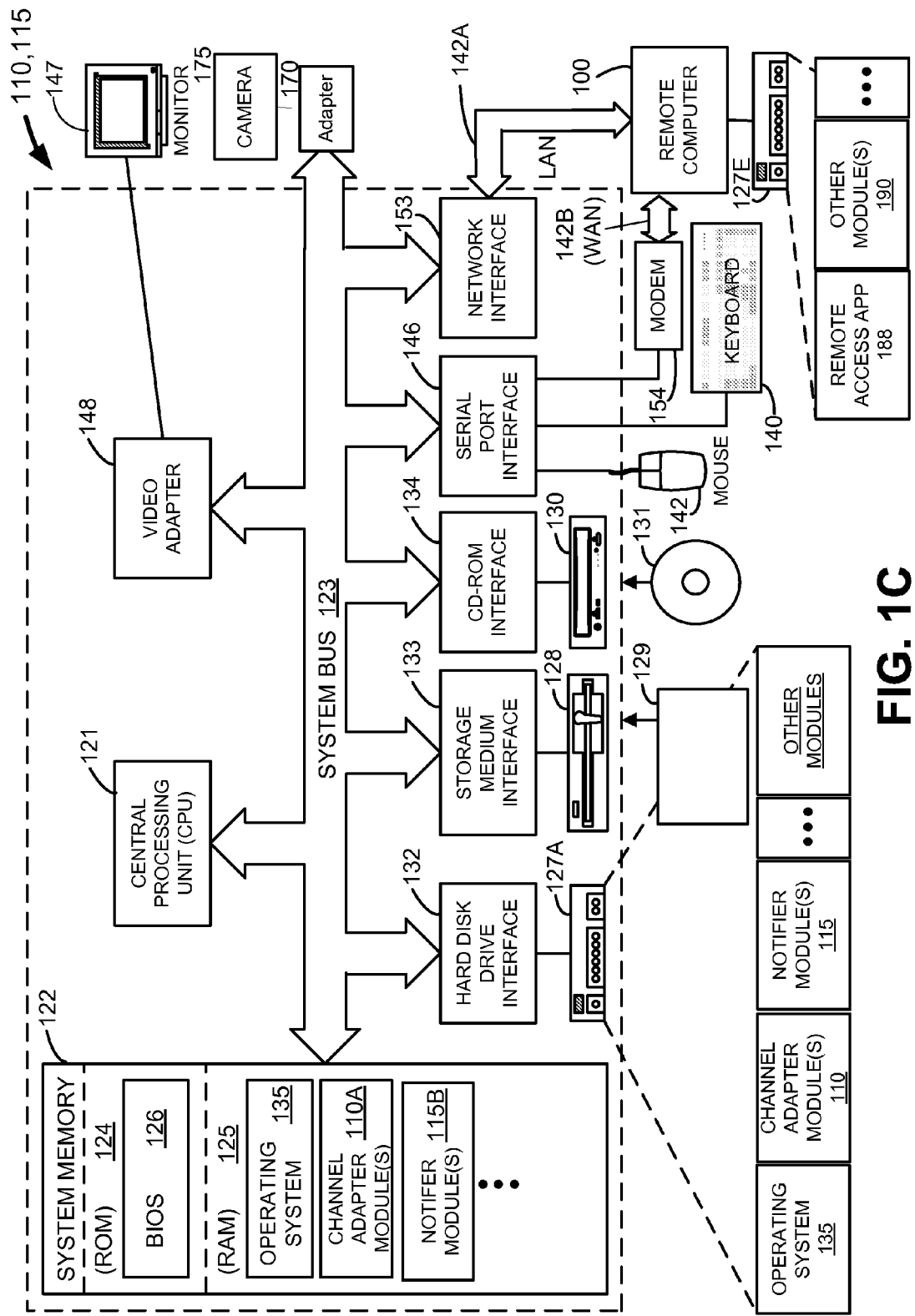
FIG. 1C is a functional block diagram of a general purpose computer that may form at least one of the channel adapter and notifier illustrated in FIG. 1A.

FIG. 1C is a functional block diagram of a general purpose computer that may form at least one of the channel adapter 110 and notifier 115 illustrated in FIGS. 1A and 1B. Generally, a computer 110, 115 includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 110, 115, such as during start-up, is stored in ROM 124.

The computer 110, 115 may include a hard disk drive 127A for reading from and writing to a hard disk, not shown, a memory card drive 128 for reading from or writing to a removable memory card 129, and/or an optional optical disk drive 130 for reading from or writing to a removable optical disk 131 such as a CD-ROM or other optical media. Hard disk drive 127A and the memory card drive 128 are connected to system bus 123 by a hard disk drive interface 132 and a memory card drive interface 133, respectively.

Although the exemplary environment described herein employs hard disk 127A and the removable memory card 129, it should be appreciated by one of ordinary skill in the art that other types of computer readable media which may store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated may be used in internet connected devices such as in portable computing devices ("PCDs") 101 that may include personal digital assistants ("PDAs"), mobile phones, tablet portable computing devices, and the like.

The drives and their associated computer readable media illustrated in FIG. 1C provide nonvolatile storage of computer-executable instructions, data structures, program modules, and other data for computer 110, 115. A number of program modules may be stored on hard disk 127, memory card 129, optical disk 131, ROM 124, or RAM 125, including, but not limited to, an operating system 135, channel adapter software modules 110A, and notifier software modules 115B. Program modules include routines, sub-routines, programs, objects, components, data structures, etc., which perform particular tasks or implement particular abstract data types.

A user may enter commands and information into computer 110, 115 through input devices, such as a keyboard 140 and a pointing device 142. Pointing devices 142 may include a mouse, a trackball, and an electronic pen that may be used in conjunction with a tablet portable computing device. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. The display 147 may comprise any type of display devices such as a liquid crystal display (LCD), a plasma display, an organic light-emitting diode (OLED) display, and a cathode ray tube (CRT) display.

A camera 175 may also be connected to system bus 123 via an interface, such as an adapter 170. The camera 175 may comprise a video camera such as a webcam. The camera 175 may be a CCD (charge-coupled device) camera or a CMOS (complementary metal-oxide-semiconductor) camera. In addition to the monitor 147 and camera 175, the computer 102, 104 may include other peripheral output devices (not shown), such as speakers and printers.

The computer 110, 115 may operate in a networked environment using logical connections to one or more remote computers such as the portable computing device 100 illustrated in FIG. 1A. A portable computing device 100 may be another personal computer, a server, a mobile phone, a router, a network PC, a peer device, or other common network node. While the portable computing device 100 typically includes many or all of the elements described above relative to the computer 110, 115, only a memory storage device 127E has been illustrated in FIG. 1C.

The logical connections depicted in the FIG. 1C include a local area network (LAN) 142A and a wide area network (WAN) 142B. Such networking environments are commonplace in offices, enterprise-wide computer networks, intranets, and the Internet. When used in a LAN networking environment, the computer 102, 104 is often connected to the local area network 142A through a network interface or adapter 153. The network interface adapter 153 may comprise a wireless communications and therefore, it may employ an antenna (not illustrated).

When used in a WAN networking environment, the computer 110, 115 typically includes a modem 154 or other means for establishing communications over WAN 142B, such as the Internet. Modem 154, which may be internal or external, is connected to system bus 123 via serial port interface 146.

In a networked environment, program modules depicted relative to the remote portable computing device 100, or portions thereof, may be stored in the remote memory storage device 127E. The portable computing device 100 may execute a remote access program module 188 as well as other modules 190 for accessing data and exchanging data with the notifier and channel adapter modules 110A, 115A running on the computer 110, 115. It may be appreciated that the network connections shown are exemplary and other means of establishing a communications link between the computers 110/115 and 100.

Moreover, those skilled in the art may appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable non-transitory media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Referring now to FIG. 2A, this figure is an exemplary user interface 200A that may be executed on a portable computing device 100 which may provide an event ticker based on data from the task management system 130A of FIG. 1B according to one exemplary embodiment. The event ticker may comprise a listing 205A of events that are occurring within a retail facility and which are detected by the source applications 105 such as the ones illustrated in FIGS. 1A-1B.

This listing 205A of events may be generated by the channel adapter 110 working in combination with the notifier 115. The exemplary events illustrated in FIG. 2A include a customer service inquiry having a date stamp of 4:45 PM; a point of sale error message having a date stamp of 4:50 PM; a suspicious customer activity event having a date stamp of 4:55 PM; and an inventory tracking event having a date stamp of 5:00 PM. According to this exemplary embodiment, this listing 205A of events displays events as they occur in a chronological order.

FIG. 2B is an exemplary user interface 200B that may be executed on a portable computing device 100 which may provide an event ticker based on data from a task management system 130A of FIG. 1B according to one exemplary embodiment. According to this exemplary embodiment, the listing 205B of events displays events in a prioritized fashion. In other words, the channel adapter 110 working in combination with the notifier 115 and the rules/formulas of the notifier database 120 have provided a prioritized listing 205B of events that have been displayed according to rules/formulas stored in the notifier database 120.

FIG. 2B corresponds with FIG. 2A in that the same events listed with the user interface 200A of FIG. 2A have been prioritized and listed in a predetermined sequence as set forth in FIG. 2B. Specifically, the suspicious customer activity event has been listed first in the listing 205B to indicate that this event has the highest priority for a manager of a retail establishment. The next most important event that is listed comprises the inventory event in which a shipping truck has just arrived at a loading dock.

The third event listed is the point of sale error message in which a particular register is out of paper and needs restock for receipts. The fourth event listed, which means that this event is the least important relative to the prior first three events, use the customer service request in the front furniture department from the terminal number 828.

One of ordinary skill the art will appreciate that the order or sequence of these events may change according to any changes and/or modifications to rules/formulas which may exist in the notifier database 120. A merchant may modify or change a new rule/formula within the notifier database 120 at his or her discretion.

FIG. 2C is another exemplary user interface 200C that may be executed on a portable computing device 100 which communicates with an e-mail system 130B of FIG. 1B according to one exemplary embodiment. The user interface 200C may comprise an e-mail that was generated by the e-mail system 130B of FIG. 1B.

FIG. 2C generally corresponds with the high valued patron example described above in connection with FIG. 1A. Specifically, a source application 105, such as the customer tracking/presence monitoring system 105B of FIG. 1B, may have detected the presence of the high valued patron entering a retail facility.

The source application 105 relays this event to the channel adapter 110 which ultimately works with the notifier 115 and the notifier database 120 as well as the target application 130 that may comprise an e-mail system 130. The e-mail system 130 generates and sends the e-mail message illustrated in FIG. 2C to a store manager who may be operating a portable computing device 100, such as a mobile phone.

With this mobile phone characterized as the portable computing device 100, the user interface 200C may be displayed to the manager who is operating the mobile phone. According to this exemplary embodiment of FIG. 2C, the e-mail message may comprise header information 210 and a body section 215. The body section 215 may comprise details about the high-value patron that was detected. Exemplary details include, but are not limited to, the name of the high-value patron, and preferences of the high-value patron. As mentioned above, such preferences about a high-value patron may include, but are not limited to, the type of brands preferred by the high-value patron and the type of payments used by the high-value patron for past purchases, etc.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the disclosure. In some instances, certain steps may be omitted or not performed without departing from the invention. Further, words such as "thereafter", "then", "next", etc. are not intended to limit the order of the steps. These words are simply used to guide the reader through the description of the sample methods described herein.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

Figure 3:
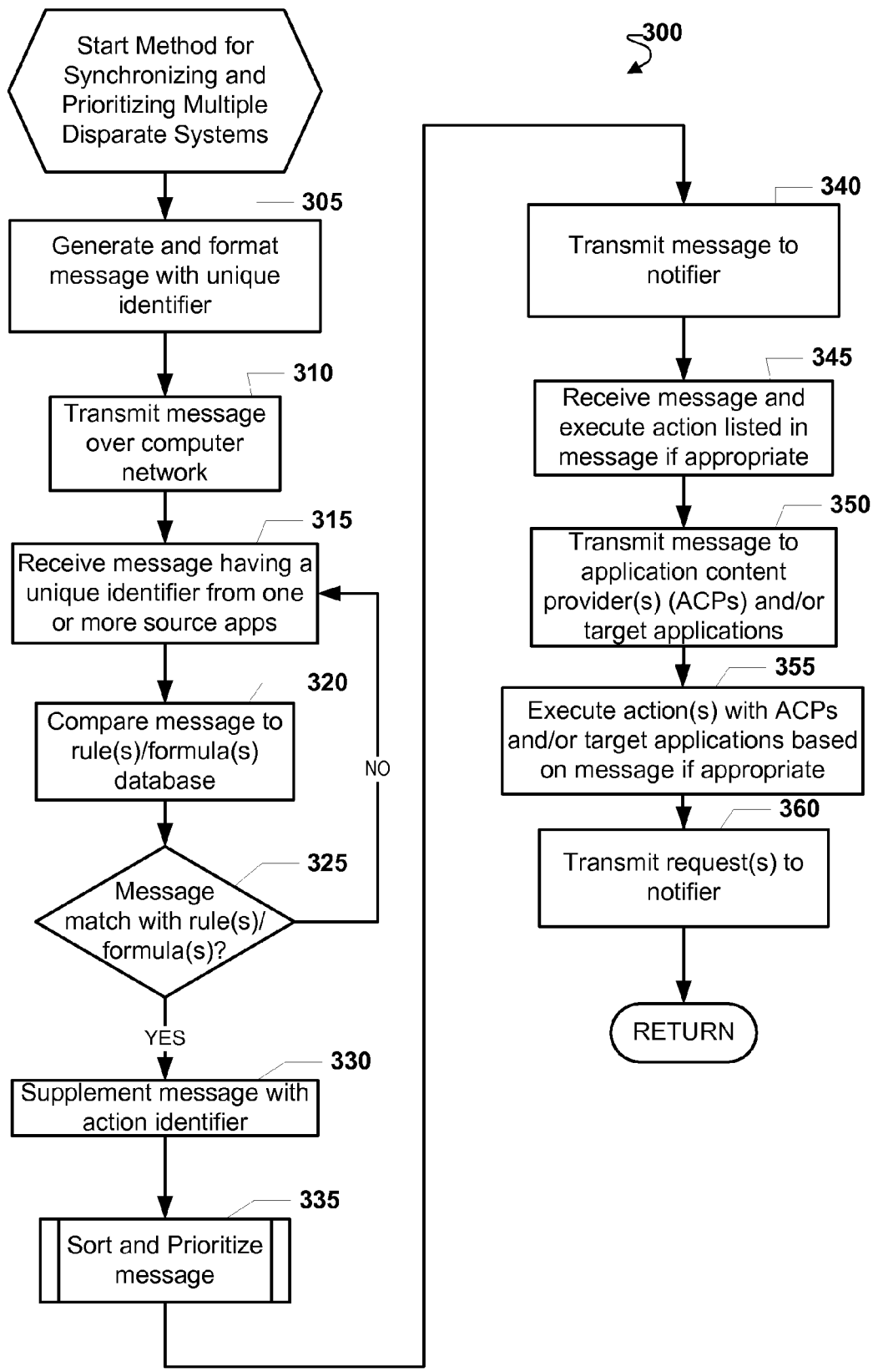
FIG. 3 is a flow chart illustrating an exemplary method for synchronizing and prioritizing multiple disparate systems according to one exemplary embodiment.

FIG. 3 is a flow chart illustrating an exemplary method 300 for synchronizing and prioritizing multiple disparate systems 105 according to one exemplary embodiment. Block 305 is the first step in method 300.

In block 305, a source application 105, such as illustrated in FIG. 1A in FIG. 1B, may generate and format a message with a unique identifier. For example, the source application 105 in the exemplary embodiment of FIG. 1A, as described above, may create the unique message identifier of "HVP1001."

Next, the source application 105 may transmit this message over the communications network 142 to the channel adapter 110. As described above, in the exemplary embodiments illustrated in FIGS. 1A and 1B, a direct connection as illustrated between the source applications 105 and the channel adapter 110. Meanwhile, this direct connection may comprise a virtual connection when the source applications are coupled to the channel adapter via the communications network 142.

Subsequently, in block 315, the channel adapter 110 may receive the message having the unique identifier that was generated by the one or more source applications 105. In block 320, the channel adapter 110 may compare the message to the rules/formulas which may exist in a notifier database 120. In decision block 325, the channel adapter 110 determines if the message matches the one or more rules/formulas in the notifier database 120.

If the inquiry to decision block 325 is positive, then the "YES" branch is followed to block 330. If the inquiry to decision block 325 is negative, then the "NO" branch is followed to block 315 in which the channel adapter 110 waits for another message from a source application 105. Also, at this stage is part of the "NO" branch logic, the channel adapter 110 may create a record of the message which was not matched with any rule and/or formula in the notifier database 120. This record of the non-matching message may also be stored in the notifier database 120.

In block 330, the channel adapter 110 may supplement the message with an action identifier. For example, the channel adapter 110 may supplement the message with additional actions that may be required of the notifier 115 and/or other systems that are coupled to the notifier 115. These message supplements may comprise alphanumeric text characters that may uniquely identify actions to be taken by the notifier 115 and/or other systems coupled to the notifier 115.

In routine block 335, the channel adapter 110 may sort and prioritize different messages that have been created by one or more different source applications 105. Further details of this routine or sub-method block 335 will be described below in connection with FIG. 4. In this routine block 335, the channel adapter 110 may assign waiting values to each message and apply rules/formulas to each message that matches with rules/formulas in the notifier database 120.

Next, in block 340, the channel adapter 110 may transmit the message over the communications network 142 to the notifier 115. As noted previously, if the channel adapter 110 and the notifier 115 are part of the same server, then the message from the channel adapter 110 would be simply relate to the notifier 115 that as residing on the same server as the channel adapter 110.

In block 345, the notifier 115 may receive the message and execute the action listed in the message if appropriate. Alternatively, or in addition to executing the message, the notifier 115 may prepare the message for transmitting to an appropriate application content provider 125 and/or target application 130.

In block 350, the notifier 115 may transmit the message over the communications network 142 to one or more appropriate application content providers 125 and/or one or more target applications 130. In this block 350, the notifier 115 may wait until it receives a request from an application content provider (ACP) 125 and/or a target application 130 before it transmits the message over the communications network 142. In this way, the notifier may act like a gatekeeper that controls work bandwidth for each ACP 125 and/or target application 130.

Exemplary target applications which were described above, but which were not limited to these exemplary embodiments, included a task management system 130A and a retail e-mail system 130B. Next, in block 355, the application content providers 125 and/or target applications 130 may execute the one or more actions contained within the messages. For example, the task management system 130A may generate the chronological event ticker 205A of FIG. 2A and/or the prioritized listing 205B of FIG. 2B.

Next, in block 360, the application content providers 125 and/or target applications 130 may transmit request to the notifier 115 for any messages that may be destined for the application content providers 125 and/or target applications 130. In some exemplary embodiments, the notifier 115 may hold or retain messages for specific application content providers 125 and/or target applications 130 in release these messages only when requested by the specific application content providers and/or target applications 130.

In this way, the notifier 115, and the system 101, may prevent the application content providers 125 and/or target applications 130 from being overwhelmed or pushed to limits beyond their capacity should the source applications 105 generate too many events that are beyond the capabilities of a respective application content provider 125 and/or target application 130.

Figure 4:
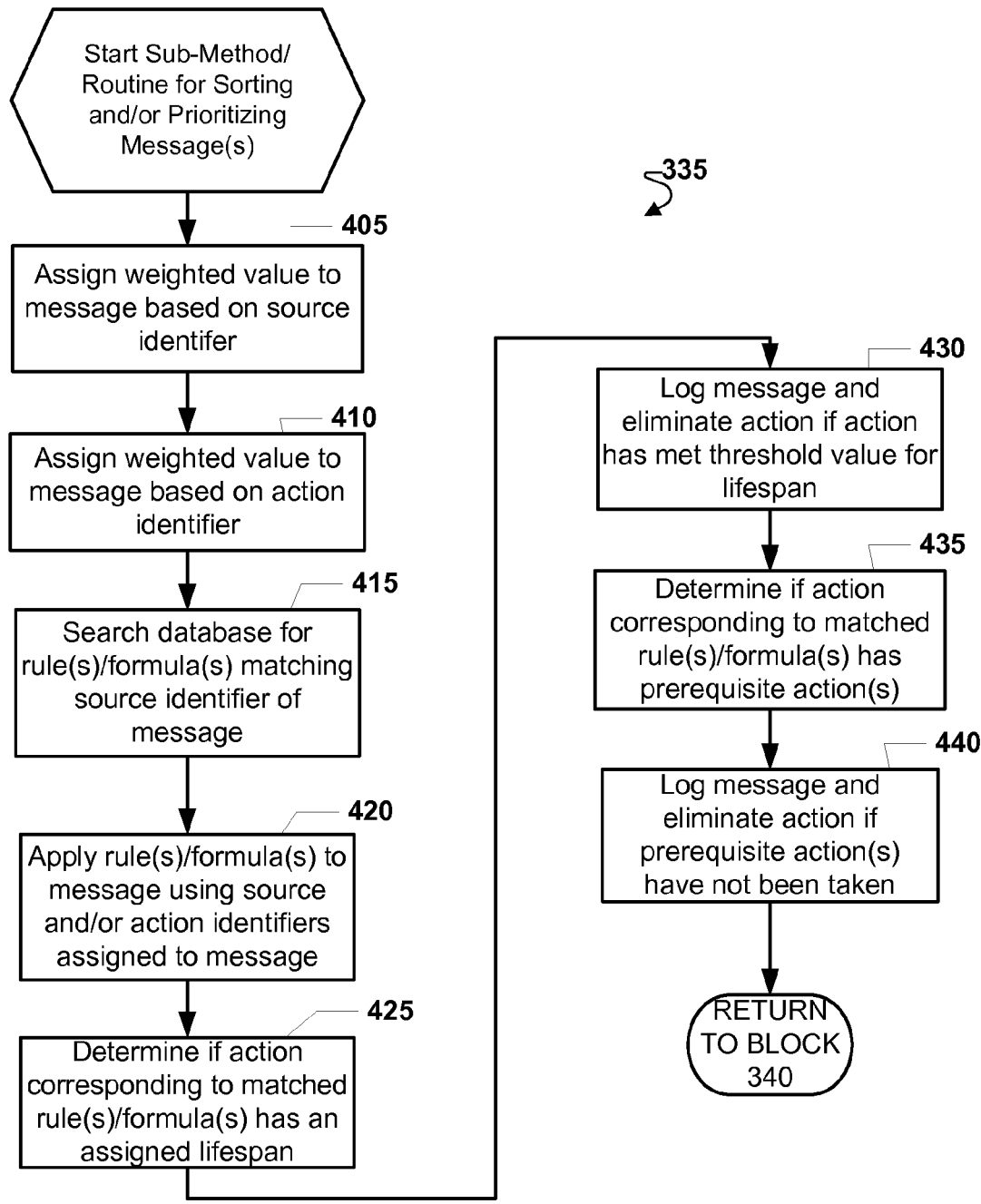
FIG. 4 is a flow chart illustrating an exemplary sub-method/routine for sorting and/or prioritizing messages that is part of the method of FIG. 3 according to one exemplary embodiment.

FIG. 4 is a flow chart illustrating an exemplary sub-method/routine 335 for sorting and/or prioritizing messages that is part of the method 300 of FIG. 3 according to one exemplary embodiment. Block 405 is the first step of routine 335.

In block 405, the channel adapter 110 may assign a weighted value to a message from a source application 105 based on a source identifier associated with the source application 105. This weighted value assigned according to a source application 105 is described above.

Next in block 410, the channel adapter 110 may assign a weight value to the same message based on an action identifier that may be part of the message. This assigning of weight values according to action identifiers is also described in detail above.

Subsequently, in block 415, the channel adapter may search the notifier database 124 rules/formulas that match a source identifier associated with the message. In block 420, the rules/formulas found in block 415, may be applied by the channel adapter 115 to the message.

Next, in block 425, the channel adapter 110 may determine if action corresponding to the matched rules/formulas has an assigned lifespan or duration as described above. If the time limit for the action has exceeded a predetermined threshold, then in block 430 the channel adapter 110 may log the message and not perform the action.

In block 435, the channel adapter 110 may determine if the action corresponding to the matched rules/formulas, has any prerequisite actions that need to be performed prior to executing the current action. In block 440, if any pre-requisite actions have not been taken in which are required for the current action, then the channel adapter 110 may log the message and eliminate/or put the current action on hold until the prerequisite action has been completed. The sub-method or routine 335 then returns to block 340 of FIG. 3.

Although only a few embodiments have been described in detail above, those skilled in the art will readily appreciate that many modifications are possible in the embodiments without materially departing from this invention. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, sixth paragraph for any limitations of any of the claims herein, except for those in which the claim expressly uses the words 'means for' together with an associated function.

What is claimed is:

1. A computer implemented method for synchronizing and prioritizing messages from separate systems within a retail establishment, wherein the retail establishment comprises a stock-keeping-unit ("SKU") scan monitoring system, a Point-Of-Sale (POS) error monitoring system, and an inventory receiving system, the method comprising:

detecting an event occurring within the retail establishment by at least one of the SKU scan monitoring system; the POS error monitoring system, and the inventory receiving system of the retail establishment;

generating a message about the event having a unique identifier with at least one of the SKU scan monitoring system; the POS error monitoring system, and the inventory receiving system of the retail establishment;

sending the message over a computer network to a channel adapter;

receiving the message with the channel adapter from the computer network having the unique identifier, the unique identifier being associated with an event occurring within the retail establishment;

comparing the message having the unique identifier with the channel adapter to at least one of a rule and a formula stored in a database;

determining with the channel adapter if the message with the unique identifier matches at least one of a rule and a formula stored in the database based on the unique identifier;

if the message matches at least one of a rule and formula in the database, then the channel adapter supplementing the message with an action identifier, the action identifier comprises one or more actions that at least one of an application content provider and a target application within the retail establishment takes in response to the message after the message having the action identifier is transmitted by the channel adapter and a notifier;

prioritizing the message with the channel adapter relative to one or more other messages based on at least one of a source identifier and the action identifier;

transmitting the message by the channel adapter to the notifier; and relaying the message from the notifier over the communications network upon receiving a request for messages that may match at least one of the application content provider and the target application that are associated with one or more operations of the retail establishment, the message comprising a first list of at least one action for responding to an event, each event on the first list occurring within the retail establishment, each action for responding to an event on the first list comprising work that is assigned to retail staff employed by the retail establishment, the message comprising a second list, the second list comprising one or more events that are arranged according to time stamps indicating a time of day at which a particular event within the retail establishment occurs.

2. The method of claim 1, wherein the unique identifier comprises alphanumeric characters.

3. The method of claim 1, wherein prioritizing the message further comprises prioritizing the message using weighting.

4. The method of claim 3, wherein weighting comprises an integer value reflecting a relative importance based on one of a source of the message and an action associated with the message.

5. The method of claim 3, wherein weighting is assigned to a message based on at least one of the source identifier and action identifier.

6. The method of claim 1, wherein an action associated with a message is assigned a predetermined lifespan.

7. The method of claim 1, further comprising generating data that comprises a prioritized list of events based on a plurality of messages that were matched against at least one rule or formula in a database.

8. A computer system for synchronizing and prioritizing messages from separate systems within a retail establishment, wherein the retail establishment comprises a stock-keeping-unit ("SKU") scan monitoring system; a Point-Of-Sale (POS) error monitoring system, and an inventory receiving system, the system comprising:
 a processor of at least one of the SKU scan monitoring system, the POS error monitoring system, and the inventory receiving system of the retail establishment detecting an event occurring within the retail establishment, the processor generating a message about the event having a unique identifier and sending the message over a computer network to a channel adapter;
 a processor operable for receiving the message from the computer network having the unique identifier, the unique identifier being associated with an event occurring within the retail establishment;
 a processor operable for comparing the message having the unique identifier to at least one of a rule and a formula stored in a database;
 a processor operable for determining if the message with the unique identifier matches at least one of a rule and a formula stored in the database based on the unique identifier;
 a processor operable for determining if the message matches at least one of a rule and formula in the database, then supplementing the message with an action identifier, the action identifier comprises one or more actions that at least one of an application content provider and a target application within the retail establishment takes in response to the message after the message having the action identifier is transmitted by the channel adapter and a notifier;
 a processor operable for prioritizing the message relative to one or more other messages based on at least one of a source identifier and the action identifier;
 a processor operable for transmitting the message to the notifier; and
 a processor operable for relaying the message from the notifier over the communications network upon receiving a request for messages that may match at least one of the application content provider and the target application that are associated with one or more operations of the retail establishment, the message comprising a first list of at least one action for responding to an event, each event on the first list occurring within the retail establishment, the action for responding to an event on the first list comprising work that is assigned to retail staff employed by the retail establishment, the message comprising a second list, the second list comprising one or more events that are arranged according to time stamps indicating a time of day at which a particular event within the retail establishment occurs.

9. The system of claim 8, wherein the unique identifier comprises alphanumeric characters.

10. The system of claim 8, wherein the processor operable for prioritizing the message further comprises the processor operable for prioritizing the message using weighting.

11. The system of claim 10, wherein weighting comprises an integer value reflecting a relative importance based on one of a source of the message and an action associated with the message.

12. The system of claim 10, wherein weighting is assigned to a message based on at least one of the source identifier and action identifier.

13. The system of claim 8, wherein an action associated with a message is assigned a predetermined lifespan.

14. The system of claim 8, further comprising a processor operable for generating data that comprises a prioritized list of events based on a plurality of messages that were matched against at least one rule or formula in a database.

15. A computer program product comprising a non-transitory computer usable medium having a computer readable program code embodied therein, said computer readable program code adapted to be executed to implement a method for synchronizing and prioritizing messages from separate systems within a retail establishment, the retail establishment comprising a stock-keeping-unit ("SKU") scan monitoring system; a Point-Of-Sale (POS) error monitoring system, and an inventory receiving system, said method comprising:
 detecting an event occurring within the retail establishment by at least one of the SKU scan monitoring system; the POS error monitoring system, and the inventory receiving system of the retail establishment;
 generating a message about the event having a unique identifier by at least one of the SKU scan monitoring system; the POS error monitoring system, and the inventory receiving system of the retail establishment;
 sending the message over a computer network to a channel adapter;
 receiving the message from the computer network having the unique identifier, the unique identifier being associated with an event occurring within the retail establishment;
 comparing the message having the unique identifier to at least one of a rule and a formula stored in a database;
 determining if the message with the unique identifier matches at least one of a rule and a formula stored in the database based on the unique identifier;
 if the message matches at least one of a rule and formula in the database, then supplementing the message with an action identifier, the action identifier comprises one or more actions that at least one of an application content provider and a target application within the retail establishment takes in response to the message after the message having the action identifier is transmitted by the channel adapter and a notifier;
 prioritizing the message relative to one or more other messages based on at least one of a source identifier and the action identifier;
 transmitting the message to the notifier; and
 relaying the message from the notifier over the communications network upon receiving a request for messages that may match at least one of the application content provider and the target application that are associated with one or more operations of the retail establishment, the message comprising a first list of at least one action for responding to an event, each event on the first list occurring within the retail establishment, the action for responding to an event on the first list comprising work that is assigned to retail staff employed by the retail establishment, the message comprising a second list, the second list comprising one or more events that are arranged according to time stamps indicating a time of day at which a particular event within the retail establishment occurs.

16. The computer program product of claim 15, wherein the unique identifier comprises alphanumeric characters.

17. The computer program product of claim 15, wherein prioritizing the message further comprises prioritizing the message using weighting.

18. The computer program product of claim 17, wherein weighting comprises an integer value reflecting a relative importance based on one of a source of the message and an action associated with the message.

19. The computer program product of claim 17, wherein weighting is assigned to a message based on at least one of the source identifier and action identifier.

20. The computer program product of claim 15, wherein an action associated with a message is assigned a predetermined lifespan.

* * * * *